UNITED STATES PATENT OFFICE.

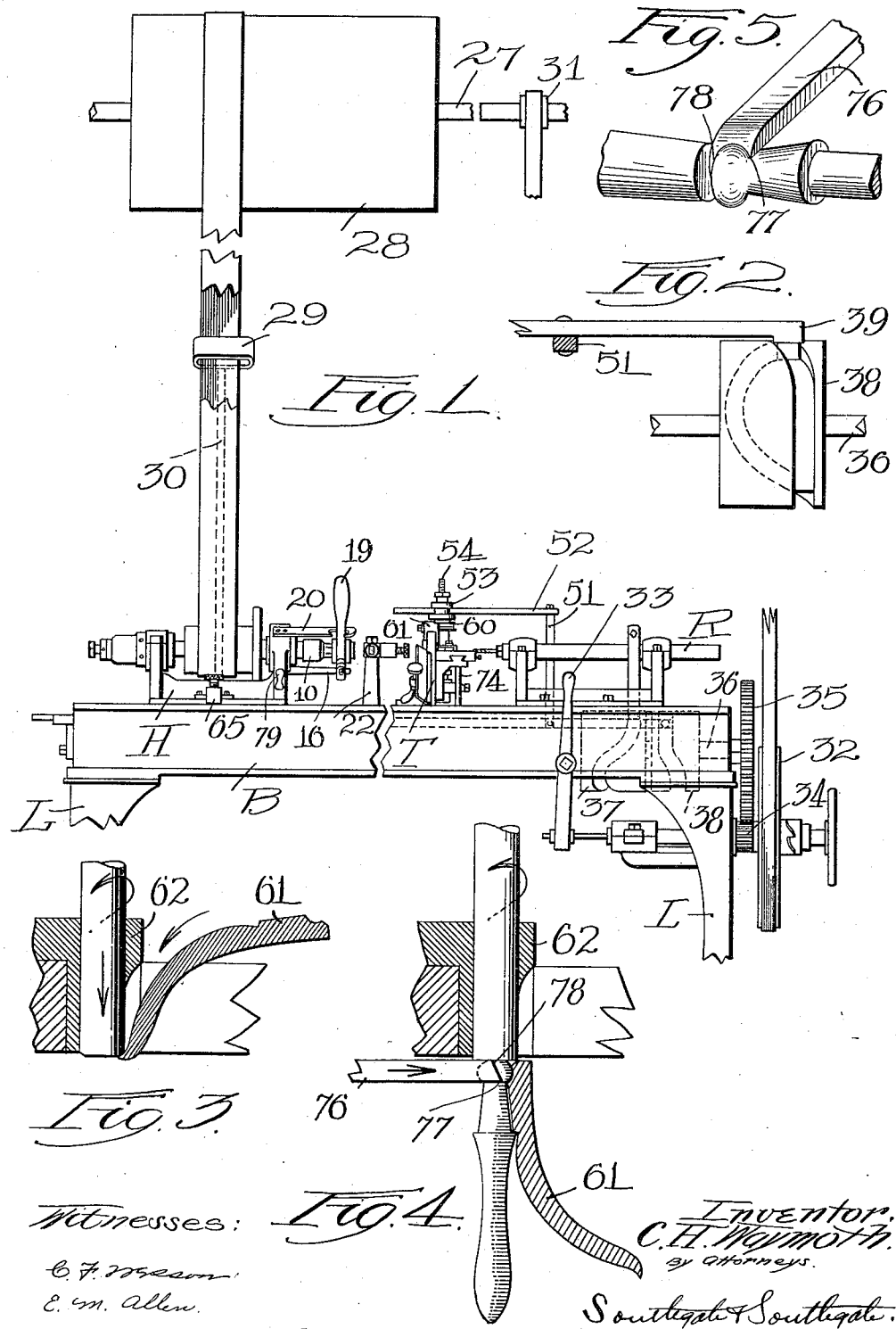

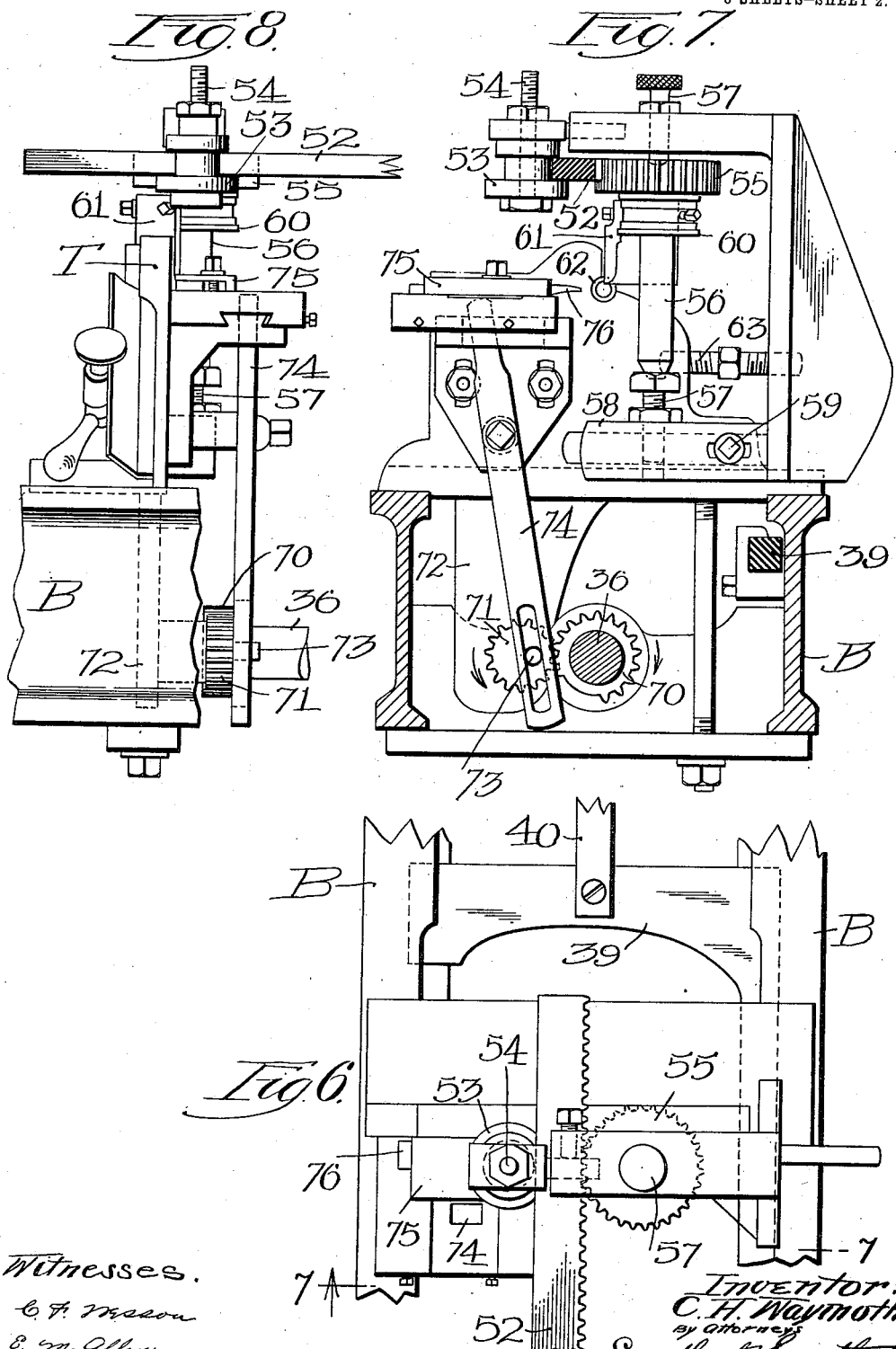

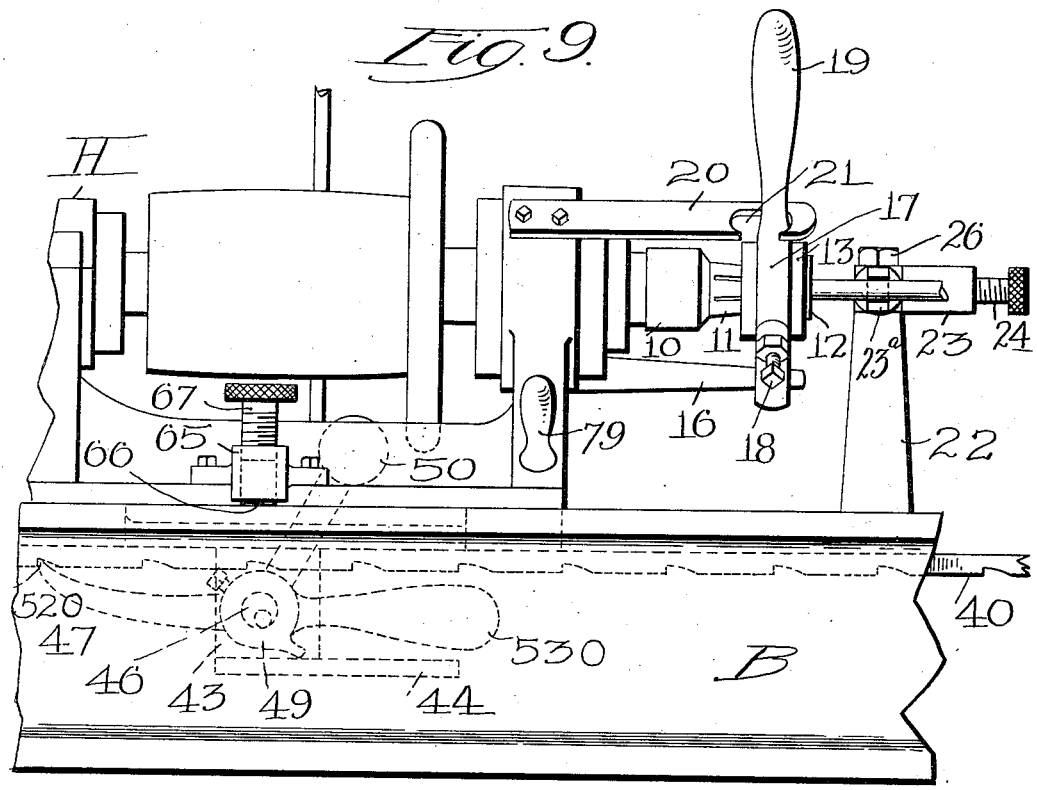
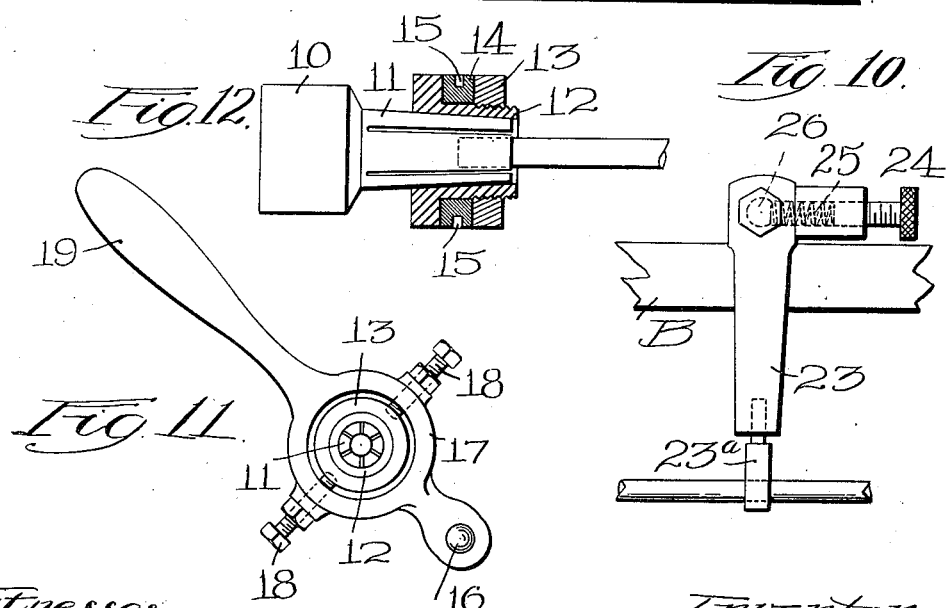

CHARLES H. WAYMOTH, OF FITCHBURG, MASSACHUSETTS.

SPINDLE-TURNING LATHE.

1,022,450.  Specification of Letters Patent.  Patented Apr. 9, 1912.

Application filed October 20, 1910. Serial No. 588,040.

*To all whom it may concern:*

Be it known that I, CHARLES H. WAYMOTH, a citizen of the United States, residing at Fitchburg, in the county of Worcester and State of Massachusetts, have invented a new and useful Spindle-Turning Lathe, of which the following is a specification.

This invention relates to that class of lathes which are used for turning spindles or small duplicate parts from wood, hard-rubber, and other material, and it is more especially designed for use in turning particularly delicate parts, as for example, those in which the spindle is provided with a longitudinal passage therethrough.

The principal objects of the invention are to provide simple and practicable means whereby, by the use of a cutter having an outline suitable for the production of the particular article desired, those which have a very small cross sectional area of stock can be turned up without chattering; to provide an improved relative motion of the stock or spindle and cutter for this purpose; to provide in coöperation with said cutter means for severing the spindle while it is on the machine; to provide a cutting off tool operating in such a way that it will not only actually sever the work, but will round up the end; to provide an improved holding means especially suitable for a hollow spindle which will readily release the work; and to provide improvements in details of construction as will appear hereinafter.

Reference is to be had to the accompanying drawings, in which—

Figure 1 is a side view of sufficient parts of a lathe and its driving connections to illustrate the application of this invention thereto. Fig. 2 is a plan on enlarged scale of one of the operating cams and connected parts. Fig. 3 is a diagrammatic plan view showing how the turning operation is started. Fig. 4 is a similar view showing the parts in position after the turning tool has completed its operation and the cutting off tool has commenced to operate. Fig. 5 is a perspective view of the work with the tool in position for cutting-off a completed article. Fig. 6 is a plan of a portion of the mechanism for operating the outline turning tool. Fig. 7 is a sectional view thereof on the line 7—7 of Fig. 6. Fig. 8 is a side view of the same. Fig. 9 is a side view of the head-stock of the lathe on enlarged scale. Fig. 10 is a plan of a detail thereof. Fig. 11 is an end view of a work holding means coöperating with the head stock, and Fig. 12 is a side view thereof partially in central longitudinal section.

For convenience in illustration I have shown this invention as applied to a form of lathe shown in my Patents Nos. 901,503 and 884,114. In these patents I have shown and claimed automatically operating wood turning lathes using roughing, shaping, and cutting off tools which either occupy fixed positions longitudinally with respect to the lathe bed or have only simple motions, and in which the work to be operated upon is mounted on a head-stock which is moved or fed longitudinally to present the work to the tools. In my Patent No. 632,604, I have shown a rotary turning tool having an outline suitable for the work in hand. I have found in practice, however, that while these patents are suitable for the work for which they are devised, yet when applied to very thin stock, particularly to blanks having a longitudinal passage therethrough, especially if made of hard-rubber or similar material, these machines sometimes will not do the work properly without chattering.

It is one particular object of the present invention to provide improvements whereby long thin blanks or spindles of hard-rubber or the like having longitudinal central passages therethrough can be turned up to any desired shape, and also can be severed between each two articles produced; whereas in my prior machines the blanks were only scored between the articles and had to be broken off, the machine producing a continuous blank consisting of a plurality of the articles.

In the accompanying drawings B designates the lathe bed which is supported upon legs L in the ordinary manner. Carried by the bed B is a movable head-stock H which is fed longitudinally to present work to the tools as described in said patents. The spindle of the head-stock is provided with a chuck 10 for holding one end of the stock or work to be operated upon.

I have found in practice that when a hollow hard rubber article is held by an ordinary chuck it is very easily broken off in such a way as to leave the broken end in the chuck and cause difficulty in removing the same. In order to overcome this difficulty I have provided a holding device of an improved form. This consists of a head or chuck 10 mounted on the head stock and having a conical projection 11 hollow to admit the end of the work and slit from end to end on several sides. The work is put into this conical projection and a hub 12 having an inner surface fitting the conical surface of the projection is slid on the same. Mounted between a nut 13 and a flange on the hub 12 is a freely rotatable collar 14 having opposite depressions 15. Mounted to swing on a stud 16 projecting from the head-stock is a lever 17 having adjusting screws 18 entering the notches 15. This lever has a handle 19 and is adapted to be held in a holder 20 on the head stock having a notch 21 for the handle. In operation when it is desired to clamp the work in position the handle 19 is moved back to the left in Fig. 9 so as to cause the work to be gripped and left in that position until it is desired to loosen the work and replace it, when it is moved to the position shown in Fig. 9. In order further to steady the work, a standard 22 is mounted on the lathe bed to support a block 23. This block normally is held in proper position by a screw 24 and spring 25, the latter adapted to engage a flat side of a bolt 26 when the block is in proper position for a guide 23ª thereon to receive the work. When it is desired to turn these parts out of the way it is a very simple matter to swing them on the shaft until they are at one side of the work.

A roughing tool may be mounted in a frame or fixture T while a spindle R may be used for centrally and longitudinally drilling the stock.

As herein illustrated, power may be applied to the lathe from an overhead shaft 27. Mounted on this shaft is a long pulley or drum 28 having a belt for driving the head-stock spindle. The rear strand of the belt passes through a guide or holder 29 carried by a rod 30 extending up from the head stock. A small feed pulley 31 carries a belt which runs upon the step 32. Turning with the step 32 and preferably connected thereto by a clutch mechanism controlled from a starting handle 33 is a pinion 34 which meshes with and drives a large gear 35 secured on the feed-shaft 36. Fastened upon the feed shaft 36 are two track cams 37 and 38. The track cam 37 is connected to operate the spindle R, while the track cam 38 is connected to operate the feeding devices. These connections are most clearly shown in Fig. 2. As illustrated in this figure, the track cam 38 engages directly with and operates a slide 39. Carried by the slide 39 is a movable feed rack 40.

Bolted on and extending down from the head-stock casting is a support 43, and journaled at one end in the support 43 is a pivot 46. The end pivots of the shaft 46 are eccentric with respect to the central part of the shaft which forms the bearing of the pawl as hereinafter described. Pivotally mounted on the shaft 46 is a pawl 47 coöperating with the movable feed-rack 40. The pawl 47 is pointed at one end 520 for engaging its rack, and is weighted at 350 so that the same will be normally swung up to engage the rack. Carried by the support 43 is a cross-piece or plate 44. In order to turn the eccentric pivot shaft of the feed-pawls so that said pawls may be raised or lowered as desired, a hub 49 is fastened on the pivot shaft, and extending up from the hub 49 is a handle carrying a weight 50. When the weight 50 is thrown to one side of its central position, the pivot shaft will be turned to lower the pawl to a position in which the weighted end of the pawl rests on the cross piece or table, so that the pawl will be disengaged from the rack. When the weight 50 is thrown to the other side of the pivot shaft, the center of the pawl will be lifted so that the pawl will be supported in operative position, as shown in Fig. 9.

The parts as thus far referred to, with the exception of the chuck and work steadying device, may be of substantially the same construction as illustrated in my prior patents before referred to.

On the slide 39 is an arm 51 connected with a rack 52 which therefore reciprocates longitudinally. This rack is guided by a roll 53 adjustably mounted on a screw 54 on the frame of the machine, and it meshes with a gear 55 on a vertical shaft 56. This shaft is held by screws 57 adapted to be adjusted to regulate its height, and the lower one is carried by a bracket 58 which is adjustable transversely by means of a bolt 59 and screw 63. On the shaft 56 is a circular holder 60. On this holder is adapted to be fixed, at any point along the circumference, a segmental turning tool 61. This shaft is intended to be adjusted so that the turning knife 61 will come into position with its edge above the center of the work which is supported by a die or work-support 62.

For the purpose of providing a friction for the head-stock so that it will have no tendency to move too far forward, a cylinder 65 is mounted on the base of the head-stock and provided with a friction member 66 therein adapted to bear on the planed upper surface of the bed of the lathe. A screw 67 is provided for regulating the friction.

Although the turning tool which I have described will turn the entire outer surface of the article to be turned it is incapable of cutting it off. It can at the most only score the blank at the end of the article so that it can be broken off afterward. In order to provide for cutting it off and also for rounding the end of the article, I have provided the following mechanism: On the feed shaft 36 is a mutilated gear 70 meshing with a gear 71 on a stud supported by a bracket 72. This gear has an eccentric stud 73 which engages in a slot in a lever 74 pivoted on the frame. This lever at its other end engages a sliding tool holder 75 which carries the cutting off tool 76. This cutting off tool is of the overshot variety having a forward edge 77 adapted to cut and round the rear corner of the article in advance of the other operations of the tool. It also has a cutting-off edge 78 adapted to come into operation after the entire edge between it and the edge 77 has operated. This cutting off edge 78 is intended to be so located by the vertical adjustment of the holder 75 as to bring it exactly on a level with the center of the work.

In operation the work is fed forward by the rack 40 through the die 62 and as its forward end comes through the die it meets the forward end of the turning tool 61. It will be understood of course that the work is rotating all the time as has been stated heretofore. The turning tool oscillates forwardly as the work is fed forward and consequently the article is turned up to the desired shape in accordance with the shape of the turning tool. When the work is advanced to the end of the feed provided by the rack 40 it stops as the feeding means moves back. At the same time the oscillation of the turning knife is stopped as the roll shown in Fig. 2 enters the straight portion of the cam 38. While this motion is interrupted the cutting off knife comes up to round off the end of the article and then cuts it off. While the cutting off tool moves back out of the way of the stock the reverse motion of the turning knife takes place, and then the feed starts again and the cycle of operations is repeated. When all the articles to be made from it have been turned up and cut off the end of the feed of the rack 40 will be reached. It is at this time that the feeding pawl is tipped over and the parts return to their initial position and at that time the handle 79 is manipulated to free the old blank and allow a new one to be inserted.

Although I have shown a roughing tool and boring drill herein it is to be understood that they are shown only to illustrate how they can be used with this invention and that they do not constitute a part of and do not need to be used with it.

While I have illustrated and described a preferred embodiment of the invention I am aware that many modifications can be made therein by any person skilled in the art without departing from the scope of the invention as expressed in the claims. Therefore I do not wish to be limited to all the details herein shown and described, but What I do claim is:—

1. In a lathe for turning spindles and the like, the combination with means for constantly rotating the work and means for intermittently feeding it forward, of a turning tool having a curved cutting edge, and means connected with said feeding means for moving the turning tool along with the work and in contact therewith as the work is fed forward so as to present successively different portions of its edge to the corresponding portions of the work and turn down the surface thereof and for returning the turning tool to starting position when the feed is inactive.

2. In a lathe, the combination with means for holding the stock to be operated upon, and means for feeding the work forward intermittently, means for stopping the feed, of a turning tool mounted to oscillate on an axis transverse to the axis of the work, and means for swinging said turning tool forward on its axis with the work as the work progresses so as to bring the different parts of its surface progressively in contact with the work, and for automatically reversing the motion of the turning tool when the end of an article and of the tool is reached and returning it to starting position during the pause in the feed ready to produce the next article.

3. In a turning lathe, the combination of means for supporting the work, an oscillatable turning knife, means for oscillating said knife back and forth on its axis, and means for feeding the work forward with the cutting knife as it oscillates in one direction, to present successively different portions of its edge to the corresponding portions of the work and for discontinuing the feed of the work while the turning knife oscillates back to starting position.

4. In a turning lathe, the combination with a support for the work, means for intermittently feeding the work forward with its front end unsupported and for simultaneously rotating the work, of a segmental turning knife mounted to oscillate on its axis in position to engage the work, and means for swinging said turning knife forward as the work moves forward and at the same speed, whereby all portions of the edge of the knife will successively engage the work and swinging it backward when the feed of the work is discontinued.

5. In a machine of the character described, the combination of means for supporting the work and feeding it forward horizontally, and intermittently, a transverse shaft adjacent to the work, a segmental turning knife carried by said shaft, and means for oscillating said turning knife in time with the forward feed and rests of the work.

6. In a machine of the character described, the combination of means for supporting the work and feeding it forward horizontally with a step by step motion, a transverse shaft adjacent to the work, a turning knife carried by said shaft, a gear mounted on said shaft, a rack meshing with said gear, and means for reciprocating said rack in time with said step by step motion whereby said shaft and turning knife will be oscillated.

7. In a machine of the character described, the combination of means for supporting the work and feeding it forward horizontally, a vertical shaft adjacent to the work, a turning knife carried by said shaft, a gear mounted on said shaft, a rack meshing with said gear, means for reciprocating said rack whereby said shaft and turning knife will be oscillated to present successively different portions of the edge of the knife to the corresponding portions of the work, and means for moving the work forward when the rack moves forward to cause the work to move with the knife and for discontinuing the longitudinal motion of the work when the rack moves backward.

8. In a machine of the character described, the combination of means for supporting the work having a passage through which the work is projected with its front end unsupported, means for feeding it forward horizontally, a vertical shaft adjacent to the work, a turning knife carried by said shaft in position to engage the unsupported end of the work, a gear mounted on said shaft, a rack meshing with said gear, means for reciprocating said rack whereby said shaft and turning knife will be oscillated to present successively different portions of the edge of the knife to the corresponding portions of the work, a frame on which said parts are mounted, means for adjusting said shaft, and means for adjusting said supporting means.

9. In a machine of the character described, the combination of a frame, a work support mounted thereon, means for adjusting said work support longitudinally, means for moving the work on said support longitudinally by a step by step motion, a shaft located on an axis transverse to the direction of motion of the work, means on the frame for adjusting the position of said shaft, a turning knife on said shaft, and means for oscillating said shaft in one direction as the work moves forward and in the opposite direction when the forward motion of the work is discontinued.

10. In a machine of the character described, the combination of a frame, a work support mounted thereon, means for moving the work forward on said support intermittently, a shaft located transverse to the direction of motion of the work, a turning knife on said shaft, and means for oscillating said knife in one direction as the work moves forward to bring the portions of the knife edge successively into contact with the moving work and in the opposite direction when the forward motion of the work is discontinued, said means comprising a cam, a slide operable by the cam, and a reciprocating rack connected with and operated by said slide.

11. In a machine of the character described, the combination of means for supporting the work and feeding it forward horizontally, a vertical shaft adjacent to the work, a turning knife carried by said shaft in position to engage the work, a gear mounted on said shaft, a rack meshing with said gear, means for reciprocating said rack whereby said shaft and turning knife will be oscillated to present successively different portions of the edge of the knife to the corresponding portions of the work, a shaft for operating said means, a mutilated gear on said shaft, a gear meshing with the mutilated gear and having an eccentric, and a cutting off tool operated by said eccentric.

12. In a machine of the character described, the combination of means for supporting the work and feeding it forward longitudinally, a turning tool adapted to move forward with the work for turning up the outline thereof, and to move backwardly when the forward motion of the work is discontinued, means for operating said tool forward and back to present successively different portions of its edge to the corresponding portions of the work, a mutilated gear, means connected with the operating means for rotating said gear, a gear meshing with the mutilated gear and having an eccentric thereon, a lever operated by said eccentric, and a horizontally reciprocable cutting off tool operated by said lever.

13. In a turning lathe, the combination with a support for the work, and means for intermittently feeding the work forward and for simultaneously rotating the work, of a segmental turning knife mounted to oscillate on its axis in position to engage the work progressively, means for swinging said turning knife forward as the work moves forward and swinging it backward when the work is stopped, a cutting off tool having means for rounding up the rear end of the article turned, and means operated by a part of said feeding and rotating means for bringing the cutting off tool into operation when the longitudinal motion of the work is discontinued.

14. In a turning lathe, the combination with a support for the work, and means for intermittently feeding the work forward with its front end unsupported and for simultaneously rotating the work, of a turning knife mounted to oscillate on its axis in position to engage the work progressively as it moves in one direction, means for swinging said turning knife forward as the work moves forward and for then stopping it and afterward swinging it backward when the work is stopped, a cutting off tool, and means operated by a part of said feeding means for bringing the cutting off tool into operation when the work and turning knife is stopped.

15. In a turning lathe, the combination of means for constantly rotating the work, means for intermittently feeding the work forward, an over-shot cutting off tool having a forward slanting edge adapted to cut off and round up the rear of the article turned, said edge projecting at the rear to a position at the height of the center of the work and projecting forwardly therefrom on the opposite side and over the top of the work, and means for moving said cutting off tool over the work horizontally when the forward motion of the work is discontinued.

16. In a turning lathe, the combination of means for rotating the work, an over-shot cutting off tool having a forward slanting edge adapted to cut off and round up the rear end of the article turned, said edge projecting at the rear to a position at the height of the center of the work and projecting forwardly and upwardly therefrom on the opposite side and over the top of the work, and means for moving said cutting off tool over the work horizontally.

In testimony whereof I have hereunto set my hand, in the presence of two subscribing witnesses.

CHARLES H. WAYMOTH.

Witnesses:
  ALBERT E. FAY,
  C. FORREST WESSON.

---

Copies of this patent may be obtained for five cents each, by addressing the " Commissioner of Patents, Washington, D. C."